United States Patent
Von Novak

(10) Patent No.: US 10,095,242 B1
(45) Date of Patent: Oct. 9, 2018

(54) INVERTIBLE DRONE FOR SELECTIVE POWER CAPTURE

(71) Applicant: QUALCOMM Incorporated, San Diego, CA (US)

(72) Inventor: William Henry Von Novak, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/641,590

(22) Filed: Jul. 5, 2017

(51) Int. Cl.
| | |
|---|---|
| *G05D 1/08* | (2006.01) |
| *H04L 29/08* | (2006.01) |
| *B64C 39/02* | (2006.01) |
| *H02S 99/00* | (2014.01) |
| *H02S 50/00* | (2014.01) |

(52) U.S. Cl.
CPC ......... *G05D 1/0808* (2013.01); *B64C 39/024* (2013.01); *H02S 50/00* (2013.01); *H02S 99/00* (2013.01); *H04L 67/125* (2013.01); *B64C 2201/021* (2013.01); *B64C 2201/042* (2013.01); *B64C 2201/066* (2013.01); *B64D 2211/00* (2013.01)

(58) Field of Classification Search
USPC .......................................................... 701/10
See application file for complete search history.

(56) References Cited

U.S. PATENT DOCUMENTS

| | | | |
|---|---|---|---|
| 4,415,133 A | 11/1983 | Phillips | |
| 6,540,179 B2 | 4/2003 | Henderson | |
| 6,955,324 B2 | 10/2005 | Tanielian | |
| 8,020,805 B2 | 9/2011 | Choi et al. | |
| 8,052,082 B1* | 11/2011 | Herlik | B64B 1/08 |
| | | | 244/125 |
| 8,448,898 B1 | 5/2013 | Frolov et al. | |
| 8,746,620 B1* | 6/2014 | Moussouris | H02S 10/40 |
| | | | 244/123.1 |
| 9,179,393 B2 | 11/2015 | Hubbell et al. | |
| 9,199,733 B2* | 12/2015 | Keennon | B64C 27/12 |
| 9,894,327 B1* | 2/2018 | Jacob | H04N 7/185 |
| 2002/0046763 A1 | 4/2002 | Berrios et al. | |

(Continued)

FOREIGN PATENT DOCUMENTS

| | | |
|---|---|---|
| WO | 2014013270 A1 | 1/2014 |
| WO | 2016138173 A1 | 9/2016 |
| WO | 2016138713 A1 | 9/2016 |

OTHER PUBLICATIONS

International Search Report and Written Opinion—PCT/US2018/029014—ISA/EPO—dated Jul. 2, 2018—17 pages.

*Primary Examiner* — Tyler D Paige
(74) *Attorney, Agent, or Firm* — The Marbury Law Group, PLLC

(57) ABSTRACT

Various embodiments include methods for operating a photovoltaic-powered drone having a photovoltaic surface on one side of at least one of wing or fuselage body of the drone. The method may include determining a flight attitude for the drone based on a first drone attitude for optimizing light energy harvesting by the photovoltaic surface and a second drone attitude for minimizing power expenditure by an onboard propulsion system of the drone to reach a designated destination. The method may include flying the drone in the determined flight attitude while converting light into electricity en route to the designated destination.

10 Claims, 10 Drawing Sheets

(56) References Cited

U.S. PATENT DOCUMENTS

| | | |
|---|---|---|
| 2004/0140399 A1 | 7/2004 | Liu |
| 2010/0147993 A1* | 6/2010 | Annati ................... B64C 27/20 244/12.2 |
| 2010/0269143 A1* | 10/2010 | Rabowsky ......... H04B 7/18591 725/63 |
| 2012/0091267 A1 | 4/2012 | Parks |
| 2013/0062457 A1 | 3/2013 | Deakin |
| 2014/0203139 A1* | 7/2014 | Moussouris .............. B64C 1/34 244/1 TD |
| 2014/0264700 A1* | 9/2014 | Janson ................. G01S 3/7861 257/435 |
| 2015/0021442 A1 | 1/2015 | Hunter |
| 2015/0041598 A1 | 2/2015 | Nugent et al. |
| 2016/0079810 A1* | 3/2016 | Frantz .................... H02J 17/00 307/104 |
| 2016/0304217 A1* | 10/2016 | Fisher ................ B60L 11/1809 |
| 2016/0311545 A1 | 10/2016 | Parks et al. |
| 2017/0039861 A1 | 2/2017 | Ceribelli et al. |
| 2017/0183095 A1* | 6/2017 | Liu ....................... B64C 39/024 |

\* cited by examiner

INVERTIBLE DRONE FOR SELECTIVE POWER CAPTURE

BACKGROUND

Unmanned aerial vehicle (UAVs), also referred to as "drones," are commonly used for crop inspections, power line inspections, security applications, communication aerostats and a host of other applications. Fixed wing drones reduce their energy requirements by relying on aerodynamic lift, rather than thrust from rotors, to remain aloft. This significantly reduces power requirements to the point that high efficiency solar cells are able to provide sufficient power to maintain altitude while the drone is in direct sunlight. Sunlight provides 1000 watts of energy per square meter, and thus with a ~30% efficient solar cell, up to 300 watts can be harvested per square meter of surface area. Such solar powered systems do encounter challenges at night or when the sun is obstructed. Alternatively, drones can be configured to receive terrestrial-based power beams via infrared lasers. For example, power transfer via near-IR laser beam can be relatively efficient and may have a higher intensity than solar. However, in order to take advantage of terrestrial-based power beaming, a drone's flight path must be restricted to routes within range of stations with terrestrial-based power beaming emitters.

Traditional fixed wing drones primarily use control surfaces to adjust the drone's attitude, which attitude determines performance (based on airspeed, atmospheric conditions, etc.). In contrast, drones that primarily use thrust to adjust attitude, like quad-copters, do not have this requirement; flight is possible in many attitudes, with the usual goal being the most efficient flight possible. However, drones that primarily use lifting surfaces to adjust attitude may have some flight modes requiring the drone to remain as "flat" as possible, such as for crop photography/spectroscopy, with the rotors used to maintain the desired drone attitude through turns, climbs, and descents. Such flight modes may require the decoupling of drone attitude versus flight path.

SUMMARY

Various embodiments include methods of operating a drone having photovoltaic cells on one side of the drone (the "photovoltaic surface"). Various embodiments may include determining a flight attitude for the drone based on a first drone attitude for optimizing light energy harvesting by the photovoltaic surface and a second drone attitude for minimizing power expenditure by an onboard propulsion system of the drone to reach a designated destination, and flying the drone in the determined flight attitude while converting light into electricity en route to the designated destination.

In some embodiments, the first drone attitude may face the photovoltaic surface directly at a primary light source of the light energy harvesting. In some embodiments, the first drone attitude may be determined based on a current date and time. In some embodiments, the flight attitude may be determined based on an average of the first drone attitude and the second drone attitude. In some of the embodiments, one of the first drone attitude and the second drone attitude may be weighted more heavily in determining the flight attitude. In some embodiments, the flight attitude may include a roll angle at which light energy harvesting supplies enough power to sustain level flight while considering an amount of lift and drag generated by wings of the drone in the roll angle.

In some embodiments, determining the flight attitude may include rolling the drone toward a first lateral direction for a first period, measuring a first series of light energy reception levels during the first period, rolling the drone toward a second lateral direction, opposite the first lateral direction, for a second period, measuring a second series of light energy reception levels during the second period, and determining the first drone attitude from the highest light energy reception level measured from the first and second series of light energy reception levels. In some embodiments, measuring the first and second series of light energy reception levels may each include measuring a plurality of light energy reception levels at regular intervals. In some embodiments, the first and second periods may end at the shorter of a predetermined period or a time corresponding to consecutive decreases in the measured light energy reception levels following an increase in the measured light energy reception levels.

In some embodiments, the flight attitude may be further determined based on a third attitude that minimizes a time to reach the designated destination. In some embodiments, the flight attitude may be further determined based on a third attitude that minimizes a distance traveled to reach the designated destination. In some embodiments, the flight attitude may be further determined based on a third attitude that minimizes a total energy required to reach the designated destination.

Further embodiments may include a drone having at least one wing, a body supporting the wing(s), a photovoltaic surface on one side of at least one of the wing and the body, and a processor supported by the body and configured with processor-executable software instructions to perform operations of the methods summarized above. Further embodiments may include a drone having various means for performing functions of the method summarized above. Further embodiments may include a non-transitory processor-readable storage medium having stored thereon processor-executable instructions configured to cause a processor of a drone to perform operations of the methods summarized above. Further embodiments may include a processing device including a processor configured with processor-executable instructions to cause a drone to perform operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
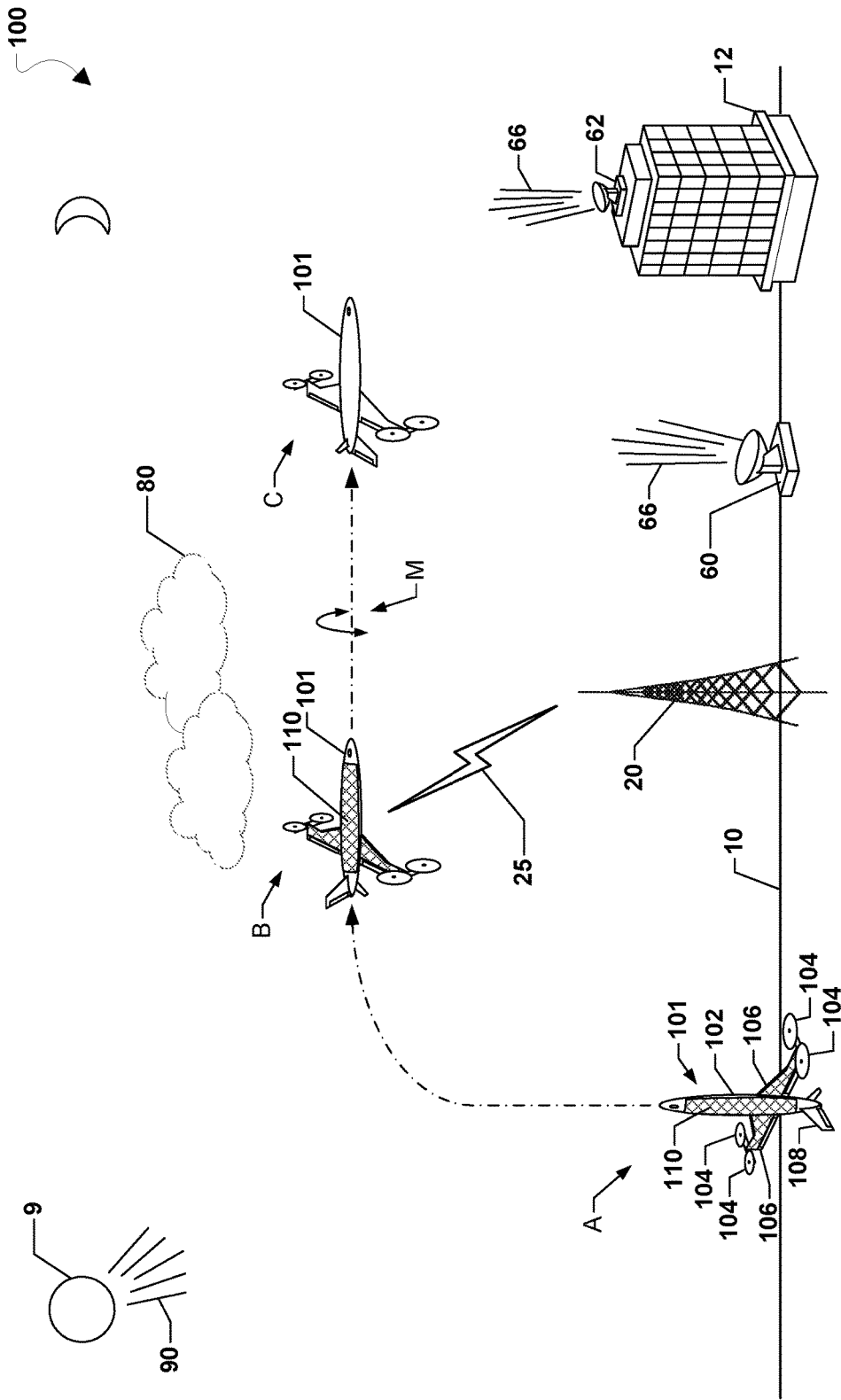
FIG. 1 is a schematic diagram of a mission environment suitable for use of various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments provide an invertible drone and method of operating such a drone that may fly and operate in either an upside up or upside down configuration for selective power capture from sunlight or artificial light sources. The invertible drone, according to various embodiments, may use one layer of photovoltaic cells on only one side of the drone, which may reduce cost and weight. High efficiency photovoltaic films are very expensive, which means including them on both top and bottom surfaces of a drone may be cost prohibitive. In addition, having photovoltaic films on both top and bottom surfaces of the drone would add significant weight, which may require more power to operate and/or reduce a range of the drone.

In accordance with various embodiments, depending on which form of light is being converted to electricity (i.e., light harvesting) and the relative direction of that source of light, the drone may fly with an attitude that maximizes energy transfer while minimizing energy usage. Often, a compromise flight attitude may be between a drone attitude that would optimize light energy harvesting by the photovoltaic surface 110 and another drone attitude that would minimize power expenditure by an onboard propulsion system of the drone to reach a designated destination.

As used herein, the term "drone" refers to an autonomous or remotely controlled vehicle that may benefit from various embodiments. Unmanned aerial vehicles are used herein as an example of an autonomous or remotely controlled vehicle that may benefit from various embodiments. However, the claims and the description are not limited to unmanned aerial vehicles and may be used in air, land, sea, space, or a combination thereof as autonomously or remotely controlled vehicles. Therefore, the particular unmanned aerial vehicles described with respect to various embodiments is for purposes of describing problems addressed and technical solutions provided by the claims and/or the various embodiments, and is not intended to limit the scope of the claims unless specifically recited in claim elements.

A drone may include an onboard processor configured to operate the drone without remote operating instructions (i.e., autonomously), such as from a human operator or remote computing device. Alternatively, the onboard processor may be configured to operate the drone with some remote operating instruction or updates to instructions stored in a memory of the onboard processor (i.e., controlled remotely or semi-autonomously). In addition, a drone may be propelled for flight using a plurality of propulsion units, each including one or more rotors, that provide propulsion and/or lifting forces for the drone.

As used herein, the terms "photovoltaic" or "photovoltaic cell" refers to semiconducting materials used to convert light into electricity. A typical photovoltaic system employs solar panels, each comprising a number of solar cells, which generate electrical power. Photovoltaic installations may be fixed, or use light tracking, which may keep an outer reception surface of the photovoltaic facing the Sun or an artificial light source. Photovoltaic systems usable on a drone tend to be light weight and thin, such as wafer-based or thin-film types. For example, wafer-based technologies may include crystalline silicon (c-Si) and/or gallium-arsenide (GaAs) materials. Thin-film technologies may include amorphous silicon, copper indium gallium selenide, and thin gallium-arsenide based photovoltaics (GaAs), such as those sold by Alta Devices (Sunnyvale, Calif.). Photovoltaic systems designed to receive artificial light work best with the highest efficiency materials, such as GaAs.

As used herein, the term "computing device" refers to an electronic device equipped with at least a processor. Examples of computing devices include processors within a controller and the drone control system and/or mission management computer that are onboard the drone, as well as remote computing devices communicating with the drone configured to perform operations of the various embodiments. Computing devices implemented in base stations or other structures may include wireless communication devices (e.g., cellular telephones, wearable devices, smartphones, web-pads, tablet computers, Internet enabled cellular telephones, Wi-Fi® enabled electronic devices, personal data assistants (PDAs), laptop computers, etc.), personal computers, and servers. In various embodiments, computing devices may be configured with memory and/or storage. Additionally, computing devices referred to in the various example embodiments may be coupled to or include wireless communication capabilities implementing various embodiments, such as network transceiver(s) and antenna(s) configured to establish a local area network (LAN) connection (e.g., Wi-Fi® transceivers).

Various embodiments may be implemented in a drone operating within a mission environment, an example of which is illustrated in FIG. 1. The example mission environment 100 includes a drone 101 at three different positions A, B, C, to illustrate how an invertible drone may operate to selectively capture power from various sources of light.

The drone 101, which is suitable for various embodiments, may be a vertical take-off and landing (VTOL) and horizontal flight (HF) aircraft that includes a body 102 (i.e., fuselage, frame, etc.) a set of four rotors 104 (quad-rotors), wings 106, and other flight control surfaces 108. The rotors 104 provide propulsion and stabilized flight controls and the wings 106 provide lift during horizontal flight and include additional flight control surfaces. In various embodiments, the drone 101 includes a photovoltaic surface 110 on one side of the drone. The photovoltaic surface 110 is configured to convert light into electricity, from either sunlight or artificial light. The drone 101 and the various elements thereof may be made out of plastic, metal, other suitable materials, and/or any combination thereof. For ease of description and illustration, some detailed aspects of the drone 101 are omitted such as a power source, wiring, frame structure, interconnects, or other features that would be known to one of skill in the art. Various embodiments may also be implemented with other types of drones, including other types of autonomous aircraft, land vehicles, waterborne vehicles, or a combination thereof.

The drone 101 is shown in position A, on the ground in a vertical configuration. The VTOL elements of the drone 101 may enable take-offs and landings in this configuration. On the ground 10, the drone 101 may be prepositioned with the photovoltaic surface 110 facing toward the Sun 9. In this orientation on the ground 10, the drone 101 may convert sunlight into electricity, which electricity may be stored in onboard batteries for later flight. Alternatively, an artificial light source (e.g., terrestrial-based power beam emitters 60, 62) may shine light that the drone 101 may convert into electricity for storage. Optionally, while on the ground 10, the drone 101 onboard batteries may be charged by a wired connection to a remote power source near the drone 101.

The drone 101 may be capable of flight with either side of the wings 106 facing up. Thus, during daytime operation, the drone 101 may be oriented so that the photovoltaic surface 110 faces up, as shown in position B, (i.e., facing in a direction of the Sun) to receive sunlight. The actual drone attitude in this upward orientation may be chosen to maximize both the power harvested and the lift-to-drag ratio (L/D). The daylight-optimized camera is also pointing downwards towards the area of interest. During nighttime operation or when the sunlight 90 is obstructed (e.g., blocked by clouds 80), the drone 101 may be oriented so that the photovoltaic surface 110 faces down, as shown in position C, to receive artificial light from one or more terrestrial-based power beam emitters 60, 62. The actual drone attitude in this downward orientation may be chosen to maximize both the power harvested and the L/D. Fixed wing multi-rotor drones, like the drone 101, may fly in many orientations, during harvesting of sunlight or artificial light, using the rotors 104 to provide flight stability and maintain a desired attitude.

In accordance with various embodiments, a processor onboard the drone 101, at the base station 20, and/or another remote computing device may determine which light source the drone 101 should use to harvest light energy. As shown in FIG. 1, after take-off from position A, the drone 101 maneuvered into a horizontal flight configuration, such as in position B. In position B, the photovoltaic surface 110 is configured to convert sunlight into electricity, while maintaining a particular level flight attitude (i.e., a first drone attitude). The attitude of the drone 101 refers to the position of the drone 101 determined by the relationship between its axes and a reference datum (such as the horizon, a particular star, or other geostationary reference). The first drone attitude in position B directs the photovoltaic surface 110 on the one side of the drone 101 to face in a first direction that faces the Sun 9. Although the first direction in which the photovoltaic surface 110 faces is not directly at the Sun 9, the sunlight 90 can still be received and converted by the drone 101. As the drone 101 continues toward its destination, the sunlight 90 may no longer be available or sufficiently available to suit the energy requirements of the drone 101. For example, the Sun may set or clouds 80 buildings 12, mountains, or other obstructions may significantly reduce available sunlight 90. Thus, a processor may direct controls of the drone to maneuver M from the first drone attitude to a second drone attitude in position B. The second drone attitude may direct the photovoltaic surface 110 on the one side of the drone to face in a second direction different from the first direction. For example, the first direction may be straight up, while the second direction may be straight down. Alternatively, the first direction may face downward or partially downward and the second direction may face upward or partially upward. Also, the first and second directions need not be exact opposite directions. The second drone attitude in position C directs the photovoltaic surface 110 on the one side of the drone 101 to face in the second direction, which in the illustrated example faces the ground and particularly toward terrestrial-based power beam emitters 60, 62. According to various embodiments, the drone 101 may execute an inversion maneuver M in any manner suitable to the drone 101.

Artificial light 66 delivered to the drone 101 from one or more of the terrestrial-based power beam emitters 60, 62 may use laser power beaming Laser power beaming is a wireless transfer of light energy from one location to another, using laser light (i.e., artificial light 66). The photovoltaic cells of the drone 101 convert the artificial light 66 to electricity, which may be stored in an onboard battery of the drone 101. The artificial light 66 from power beam emitters tends to be much more intense than sunlight, may generally be aimed at a desired location, and may be delivered 24 hours per day. In this way, power contained within the artificial light can be transmitted through air, space, optical fibers, and other media. The artificial light generated by power beam emitters may be a narrow beam that allows greater energy concentration at long distances. Also, the artificial light transmission does not cause any radio frequency interference (e.g. to Wi-Fi and/or cellular systems). Although only one power beam emitter (e.g., one of the terrestrial-based power beam emitters 60, 62) is generally used to supply artificial light to the drone 101, there may be an overlap in laser light delivery as one power beam emitter starts getting out of range and the next power beam emitter comes into range. Terrestrial-based power beam emitters may be located in fixed or portable installations. For example, FIG. 1 shows a ground installation of one terrestrial-based power beam emitter 60 and a rooftop installation of another terrestrial-based power beam emitter 62. Alternatively, terrestrial-based power beam emitters may be located on a waterborne vessel or a mobile ground vehicle (e.g., truck, train, etc.).

The determination as to which light source to use may be part of a predetermined flight plan or based on a received data input, such as navigational instructions from an operator or controller of the drone 101 and/or from real-time flight data. A predetermined flight plan may take into account the route the drone 101 will take, the time of day (i.e., for solar positioning), the availability of terrestrial-based power emitters along or near the route, the amount of power needed by the drone 101, and other considerations. In contrast, the received data input may reflect changing conditions, instructions, or other real-time circumstances.

One form of data input that may be received by a processor of the drone 101 is navigational instruction, which may include direct navigational commands received from an operator or remote controller. The operator or remote controller may have its own information regarding how the drone 101 should operate and which light source should be used. Another form of data input that may be received by the processor of the drone is real-time flight data, which may include data inputs received from a light sensor, anemometer, stored power-level indicators, camera, other sensors/instruments, or a combination thereof. For example, a light sensor on the drone 101 may provide a measure of incident light on the photovoltaic surface (received by the processor as a data input). The same light sensor, or another light sensor may provide a measure of incident light on the opposite side of the drone. The processor may then compare the measure of incident light against a light reception threshold to determine whether a sufficient level of energy is being harvested as required by mission parameters. The processor may also compare the measure of incident light on one side of the drone to a measure of incident light on a second side of the drone. In this way, the processor may determine to invert the drone when the measure of incident light on the photovoltaic surface is less than the light reception threshold, or when more incident light is available on one side than the other.

A wireless communication link 25 may allow an operator or remote controller to communicate (e.g., providing navigational commands or exchanging other data) with the drone 101 via the base station 20. The wireless communication link 25 may include a plurality of carrier signals, frequencies, or frequency bands, each of which may include a plurality of logical channels. The wireless communication link 25 may utilize one or more radio access technologies (RATs). Examples of RATs that may be used in the wireless communication link 25 include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the mission environment 100 include medium range protocols such as Wi-Fi, LTE-U, LTE-Direct, LAA, MuLTEfire, and relatively short-range RATs such as ZigBee, Bluetooth, and Bluetooth Low Energy (LE).

Figure 2:
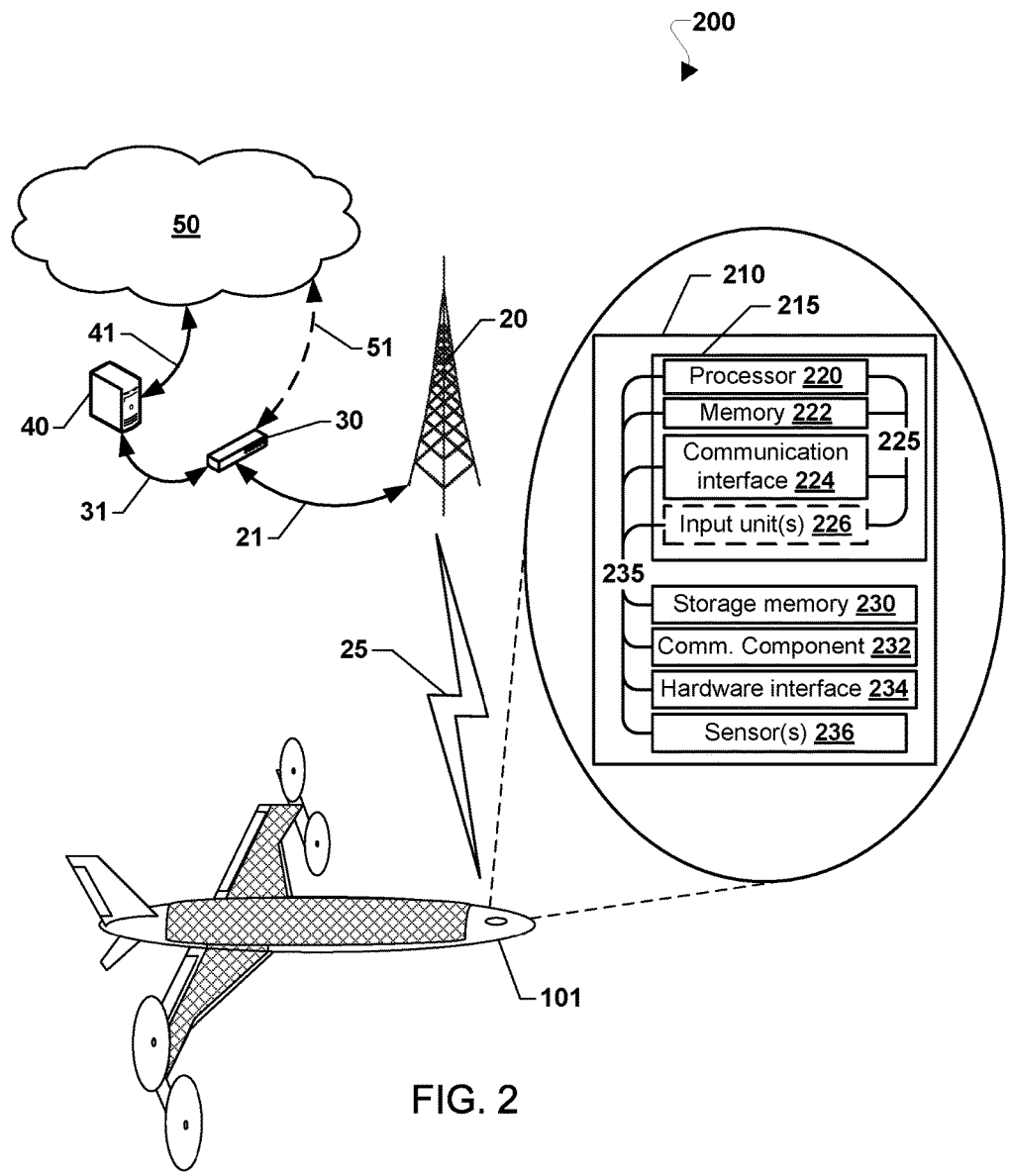
FIG. 2 is a schematic diagram illustrating a drone, a communication network, and components thereof according to various embodiments.

Various embodiments may be implemented within a variety of drones configured to communicate with one or more communication networks, an example of which suitable for use with various embodiments is illustrated in FIG. 2. With reference to FIGS. 1 and 2, the mission environment 200 may include the drone 101 and the base station 20, as well as a remote computing device 30, a remote server 40, and a communication network 50.

The base station 20 may provide the wireless communication link 25, such as through wireless signals to the drone 101. The base station 20 may include one or more wired and/or wireless communications connections 21, 31, 41, 51 to the communication network 50. The communication network 50 may in turn provide access to other remote base stations over the same or another wired and/or wireless communications connection. The remote computing device 30 may be configured to control the base station 20, the drone 101, and/or control wireless communications over a wide area network, such as providing a wireless access points and/or other similar network access point using the base station 20. In addition, the remote computing device 30 and/or the communication network 50 may provide access to a remote server 40. The drone 101 may be configured to communicate with the remote computing device 30 and/or the remote server 40 for exchanging various types of communications and data, including location information, navigational commands, data inquiries, and mission data.

The terms "server" or "remote server" are used herein interchangeably to refer to any computing device capable of functioning as a server, such as a master exchange server, web server, and a personal or mobile computing device configured with software to execute server functions (e.g., a "light server"). Thus, various computing devices may function as a server 40, such as any one or all of cellular telephones, smart-phones, web-pads, tablet computers, Internet enabled cellular telephones, wide area network (WAN) enabled electronic devices, laptop computers, personal computers, a computing device specific to the base station 20, the remote computing device 30, and similar electronic devices equipped with at least a processor, memory, and configured to communicate with a drone. The server 40 may be a dedicated computing device or a computing device including a server module (e.g., running an application that may cause the computing device to operate as a server). A server module (or server application) may be a full function server module, or a light or secondary server module (e.g., light or secondary server application). A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

The drone 101 may include a processing device 210 that is configured to monitor and control the various functionalities, sub-systems, and/or other components of the drone 101. For example, the processing device 210 may be configured to monitor and control various functionalities of the drone 101, such as any combination of modules, software, instructions, circuitry, hardware, etc. related to propulsion, navigation, power management, sensor management, and/or stability management.

The processing device 210 may house various circuits and devices used to control the operation of the drone 101. For example, the processing device 210 may include a processor 220 that directs the control of the drone 101. The processor 220 may include one or more processors configured to execute processor-executable instructions (e.g., applications, routines, scripts, instruction sets, etc.) to control flight, antenna usage, and other operations of the drone 101, including operations of various embodiments. In some embodiments, the processing device 210 may include memory 222 coupled to the processor 220 and configured to store data (e.g., flight plans, obtained sensor data, received messages, applications, etc.). The processor 220 and memory 222, along with (but not limited to) additional elements such as a communication interface 224 and one or more input unit(s) 226, may be configured as or included in a system-on-chip (SoC) 215.

The processing device 210 may include more than one SoC 215 thereby increasing the number of processors 220 and processor cores. The processing device 210 may also include processors 220 that are not associated with an SoC 215. Individual processors 220 may be multi-core processors. The processors 220 may each be configured for specific purposes that may be the same as or different from other processors 220 of the processing device 210 or SOC 215. One or more of the processors 220 and processor cores of the same or different configurations may be grouped together. A group of processors 220 or processor cores may be referred to as a multi-processor cluster.

The terms "system-on-chip" or "SoC" as used herein refer to a set of interconnected electronic circuits typically, but not exclusively, including one or more processors (e.g., 220), a memory (e.g., 222), and a communication interface (e.g., 224). The SOC 215 may include a variety of different types of processors 220 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 215 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 215 may include one or more processors 220. The processing device 210 may include more than one SoC 215, thereby increasing the number of processors 220 and processor cores. The processing device 210 may also include processors 220 that are not associated with the SoC 215 (i.e., external to the SoC 215). Individual processors 220 may be multi-core processors. The processors 220 may each be configured for specific purposes that may be the same as or different from other processors 220 of the processing device 210 or the SOC 215. One or more of the processors 220 and processor cores of the same or different configurations may be grouped together. A group of processors 220 or processor cores may be referred to as a multi-processor cluster.

The processing device 210 may further include one or more sensor(s) 236, such as an altimeter or camera, that may be used by the processor 220 to determine flight attitude and location information to control various processes on the drone 101. For example, in some embodiments, the processor 220 may use data from sensors 236 (e.g., a light sensor using photoresistors, photodiodes, and/or phototransistors) as an input for determining whether to invert the drone 101. One or more other input units 226 may also be coupled to the processor 220. Various components within the processing device 210 and/or the SoC 215 may be coupled together by various circuits, such as a bus 225, 235 or another similar circuitry.

In various embodiments, the processing device 210 may include or be coupled to one or more communication components 232, such as a wireless transceiver, an onboard antenna, and/or the like for transmitting and receiving wireless signals through the wireless communication link 25. The one or more communication components 232 may be coupled to the communication interface 224 and may be configured to handle wireless wide area network (WWAN) communication signals (e.g., cellular data networks) and/or wireless local area network (WLAN) communication signals (e.g., Wi-Fi signals, Bluetooth signals, etc.) associated with ground-based transmitters/receivers (e.g., base stations, beacons, Wi-Fi access points, Bluetooth beacons, small cells (picocells, femtocells, etc.), etc.). The one or more communication components 232 may receive data from radio nodes, such as navigation beacons (e.g., very high frequency (VHF) omni-directional range (VOR) beacons), Wi-Fi access points, cellular network base stations, radio stations, etc.

The processing device 210, using the processor 220, the one or more communication components 232, and an antenna may be configured to conduct wireless communications with a variety of wireless communication devices, examples of which include the base station or cell tower (e.g., base station 20), a beacon, server, a smartphone, a tablet, or another computing device with which the drone 101 may communicate. The processor 220 may establish a bi-directional wireless communication link 25 via a modem and an antenna. In some embodiments, the one or more communication components 232 may be configured to support multiple connections with different wireless communication devices using different radio access technologies. In some embodiments, the one or more communication components 232 and the processor 220 may communicate over a secured communication link. The security communication links may use encryption or another secure means of communication in order to secure the communication between the one or more communication components 232 and the processor 220.

While the various components of the processing device 210 are illustrated as separate components, some or all of the components (e.g., the processor 220, the memory 222, and other units) may be integrated together in a single device or module, such as a system-on-chip module.

Drones may navigate or determine positioning using altimeters or navigation systems, such as Global Navigation Satellite System (GNSS), Global Positioning System (GPS), etc. In some embodiments, the drone 101 may use an alternate source of positioning signals (i.e., other than GNSS, GPS, etc.). The drone 101 may use position information associated with the source of the alternate signals together with additional information (e.g., dead reckoning in combination with last trusted GNSS/GPS location, dead reckoning in combination with a position of the drone takeoff zone, etc.) for positioning and navigation in some applications. Thus, the drone 101 may navigate using a combination of navigation techniques, including dead-reckoning, camera-based recognition of the land features below and around the drone 101 (e.g., recognizing a road, landmarks, highway signage, etc.), etc. that may be used instead of or in combination with GNSS/GPS location determination and triangulation or trilateration based on known locations of detected wireless access points.

In some embodiments, the processing device 210 of the drone 101 may use one or more of various input units 226 for receiving control instructions, data from human operators or automated/pre-programmed controls, and/or for collecting data indicating various conditions relevant to the drone 101. For example, the input units 226 may receive input from one or more of various components, such as camera(s), microphone(s), position information functionalities (e.g., a global positioning system (GPS) receiver for receiving GPS coordinates), flight instruments (e.g., attitude indicator(s), gyroscope(s), anemometer, accelerometer(s), altimeter(s), compass(es), etc.), keypad(s), etc. The camera(s) may be optimized for daytime and/or nighttime operation.

Drones may be winged or rotor craft varieties. For example, the drone 101 may be a rotary propulsion design that utilizes one or more rotors 104 driven by corresponding motors to provide lift-off (or take-off) as well as other aerial movements (e.g., forward progression, ascension, descending, lateral movements, tilting, rotating, etc.). The drone 101 is illustrated as an example of a drone that may utilize various embodiments, but is not intended to imply or require that various embodiments are limited to a quad-rotor VTOL-HF aircraft.

Figure 3A:
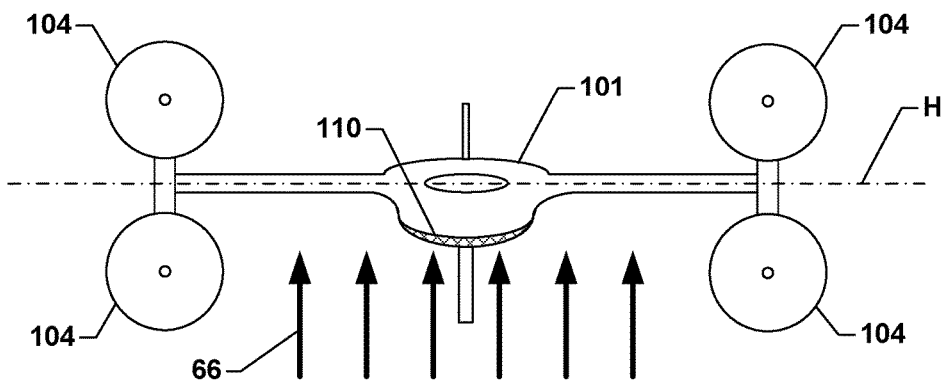
FIG. 3A is a front elevation view of a drone flying directly over a terrestrial-based power beam emitter according to various embodiments.
Figure 3B:
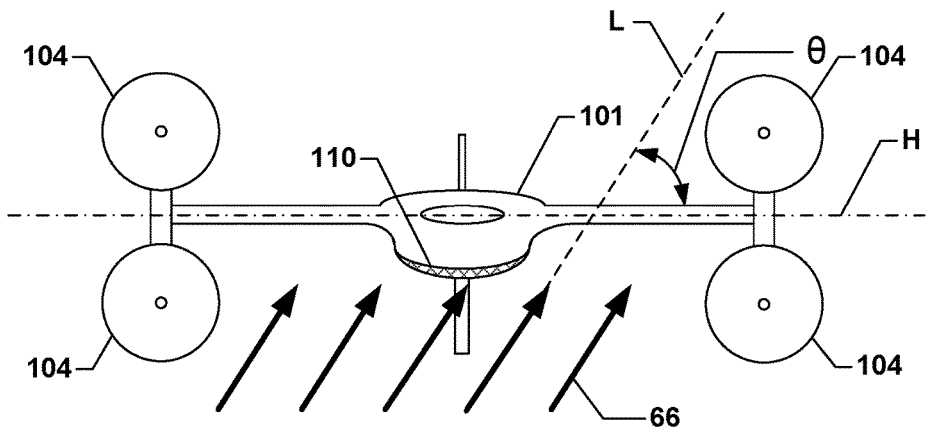
FIG. 3B is a front elevation view of the drone of FIG. 3A flying over a terrestrial-based power beam emitter directing artificial light at the drone at an oblique angle according to various embodiments.
Figure 3C:
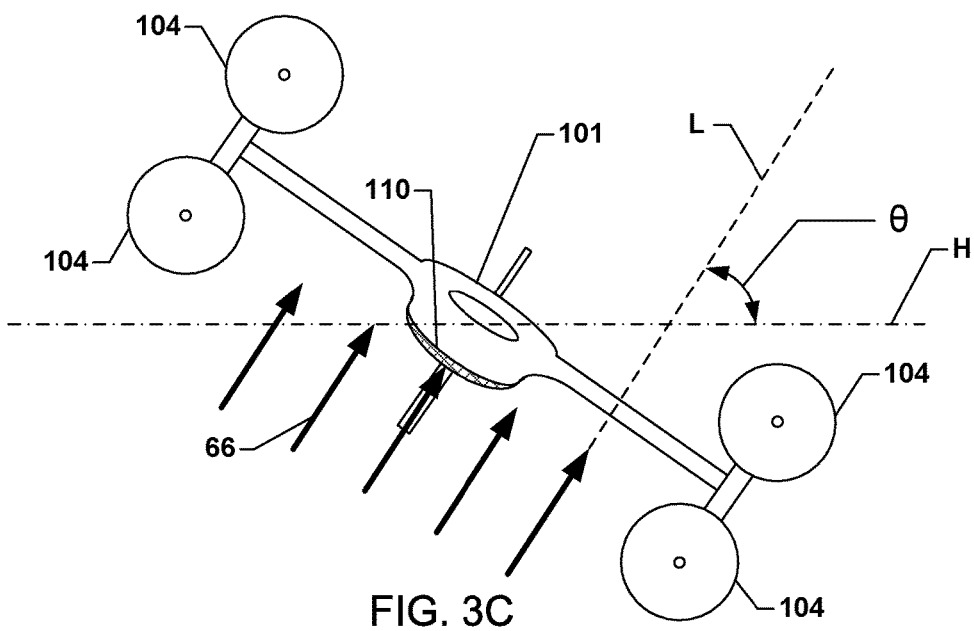
FIG. 3C is a front elevation view of the drone of FIGS. 3A and 3B flying over a terrestrial-based power beam emitter directing artificial light at the drone at an oblique angle, with the drone having rolled to match the oblique angle, according to various embodiments.

In accordance with various embodiments, the drone 101 may vary its attitude by adjusting a roll angle while flying along a given trajectory, as illustrated in FIGS. 3A-3C. With reference to FIGS. 1-3C, the drone 101 may effectively have two degrees of freedom while flying along a given trajectory—its pitch (closely related to angle of attack) and roll. Since the rotors 104 may be used to control attitude, the drone may fly at arbitrary roll attitudes with some loss of L/D and some change in trajectory (due to the lift lost in the direction of the roll). Similar, fixed wing drones with less than four rotors 104 in a quad-rotor configuration may fly in a slip—using rudder/aileron cross-control to maintain a given roll angle without turning. This is less efficient than using rotor power to do the same thing, but the end result may be similar.

FIG. 3A illustrates a front view of the drone 101 flying directly over terrestrial-based power beam emitter (e.g., 60, 62 in FIG. 1), transmitting artificial light 66. Since the artificial light 66 is coming from directly below the drone 101, the angle of incidence on the photovoltaic surface 110 is ninety degrees (i.e., perpendicular) and thus a flat attitude (i.e., parallel to a horizontal plane H) may be an optimal drone attitude.

FIG. 3B illustrates a front view of the drone 101 flying away from the terrestrial-based power beam emitter, which is transmitting artificial light 66. Based on the relative position of the terrestrial-based power beam emitter and the drone 101, a direction L of the artificial light 66 is coming from below the drone 101 at an oblique angle θ relative to the horizontal plane H. Thus, the oblique angle θ corresponds to the angle of incidence of the artificial light landing on the photovoltaic surface 110 and thus a flat attitude is no longer ideal for light energy harvesting.

FIG. 3C illustrates a front view of the drone 101 flying away from the terrestrial-based power beam emitter, which is transmitting artificial light 66 in the direction L, but now the drone 101 is flying at a roll angle θ that matches the oblique angle θ of the artificial light. With the drone maintaining the roll angle θ, which matches the oblique angle θ of the artificial light, the angle of incidence of the artificial light landing on the photovoltaic surface 110 is ninety degrees (i.e., an optimal drone attitude for light energy harvesting).

Often, the optimal drone attitude may use a roll angle that is between one that provides an optimal L/D (i.e., minimizing power expenditure by onboard propulsion systems), like that shown in FIG. 3B and one that provides an optimal light energy harvesting, like that shown in FIG. 3C. A processor (e.g., 220 in FIG. 2) determining the optimal drone attitude may choose an optimal roll angle based on power needed, trajectory requirements and L/D considerations. For example, the processor may maintain the drone 101, for most of a mission flight time, at an attitude having a smaller roll angle relative to the horizontal H. The actual roll angle used may be selected to provide just enough power (i.e., from converting light into electricity using the photovoltaic cells) to maintain flight. During the mission flight, if the drone 101 needs more power, such as to transmit data periodically or occasionally to a ground station 20, the processor may roll the drone 101 to or at least closer to an optimal energy harvesting roll angle, at the expense of reduced lift and increased drag generated by the wing in the roll angle. The processor directing the control of the drone may also make other compensations, such as reducing airspeed while the power demand is higher.

To determine an appropriate drone attitude, the processor may at least consider or compare the power required to maintain level flight and power available from the full power directed toward the photovoltaic surfaces of the drone. In determining the power required for maintaining level flight, the processor may be programmed to consider that lift is lost (and drag may be increased) in relation to the cosine of the roll angle away from the horizontal H. In contrast, power requirements of the drone 101 scale by the L/D, such that the power requirements go up by the inverse of the cosine of the roll angle. In this way, minimizing the roll angle generally minimizes power expenditure by getting the most lift and least drag from the wings. When considering power available, the processor may be programmed to consider that light energy harvesting efficiency is diminishes by the cosine of the pivot angle away from the direction of the incoming light. Thus, minimizing the pivot angle away from the direction of the incoming light may be optimal for light energy harvesting.

Reception of sunlight 90 on the photovoltaic surface 110 by the drone 101 may be affected by a position of the drone 101 relative to the sun 9. Similarly, reception of artificial light 66 from the terrestrial-based power beam emitters 60, 62 on the photovoltaic surface 110 by the drone 101 may be affected by a position of the drone 101 relative to the terrestrial-based power beam emitters 60, 62. Also, intermediate obstructions, such as clouds 80, a building 12, or other obstacles may impact the reception quality of the sunlight 90 or artificial light 66.

The location of the drone 101 may be determined from position information (i.e., received from an onboard altimeter, a GPS unit, an airspeed/groundspeed indicator, and/or a remote computing device) indicating, directly or indirectly, where the drone 101 is located. For example, the onboard altimeter and/or GPS unit may provide a direct indication of altitude and/or location; while the velocity of the drone (i.e., measured with an airspeed/groundspeed indicator) may be combined with previous position information (i.e., last known/estimated position) and predetermined flight path information to calculate a current altitude and/or location. The position information may be used by the drone 101 to determine the attitude that should be maintained en route (i.e., on the way) to a designated destination.

Figure 4:
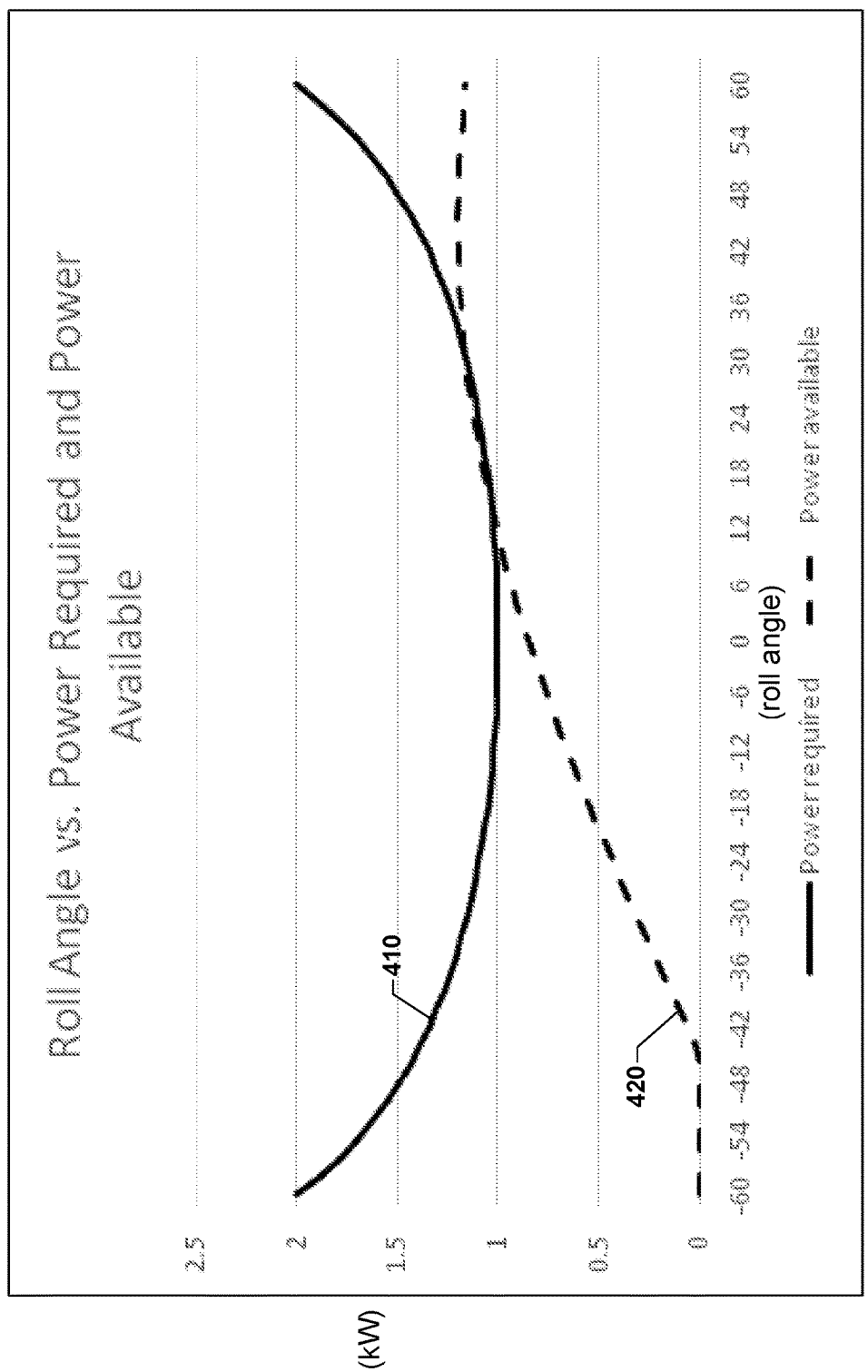
FIG. 4 shows Table 1, which shows plots of the power required and the power available versus the roll angle of the drone, according to various embodiments.

In accordance with various embodiments, an optimal roll angle may be determined by considering each of the power required and the power available versus the roll angle of the drone (e.g., drone 101), as shown in Table 1 included in FIG. 4. With reference to FIGS. 1-4, beamed power in the form of artificial light (e.g., 66 in FIG. 1) may come from a direction that is 45 degrees off from horizontal. In FIG. 4, the solid-line curve 410 represents the power required to maintain level flight across various roll angles. Also, the dotted-line curve 420 represents the power available, from the full power reaching the photovoltaic surfaces of the drone, across the same roll angles of the drone. It may be noted that along the solid-line curve 410 (i.e., power required) at a roll angle of 60 degrees, twice as much power is required to maintain level flight as compared to wings-level flight (i.e., a roll angle of zero degrees). Along the dotted-line curve 420

(i.e., power available) at 45 degrees, power is maximized (i.e. the photovoltaic surface of the drone is facing directly at the source). A further analysis of Table 1 shows that in wings-level flight, there is a deficit between power required and power available due to loss in transmitted power from the off-axis orientation of the photovoltaic surface. In addition, when power is maximized, L/D has decreased to the point that level flight may not be possible. The roll angles that promote level flight are between 16 and 30 degrees. It will be desirable to maintain the minimum roll angle that allows level flight, since roll angles may cause deflection on the direction of flight compared to a wings-level attitude.

Figure 5A:
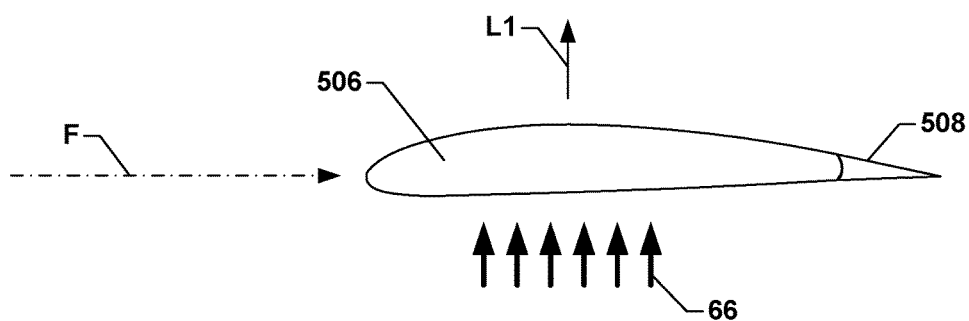
FIG. 5A is a side cross-sectional view of an asymmetric airfoil configured at or close to a zero angle of attack, according to various embodiments.
Figure 5B:
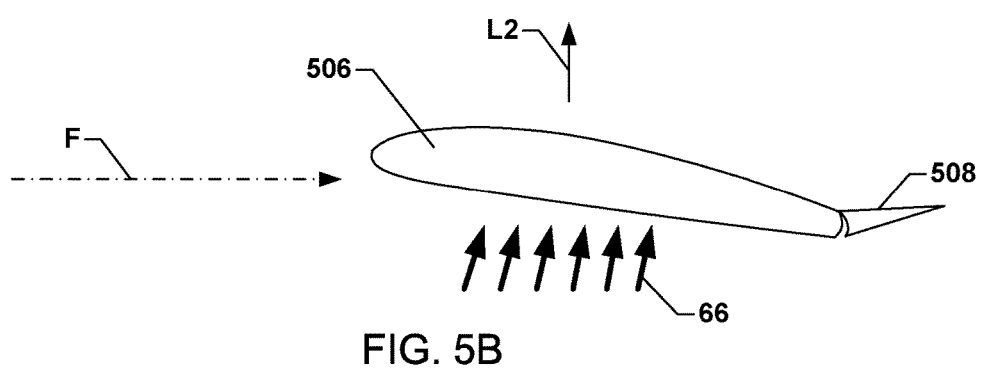
FIG. 5B is a side cross-sectional view of the asymmetric airfoil of FIG. 5A with an elevon and a leading edge lifted, according to various embodiments.
Figure 5C:
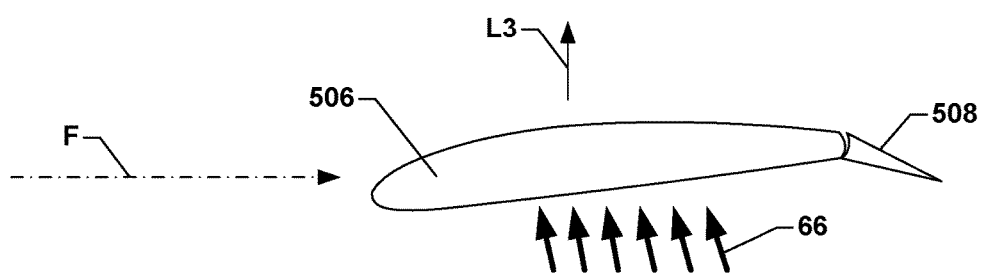
FIG. 5C is a side cross-sectional view of the asymmetric airfoil of FIGS. 5A and 5b with an elevon and a leading edge dropped, according to various embodiments.

In accordance with various embodiments, an optimal pitch angle may be determined by considering an incident angle of light received on an airfoil 506, as shown in FIGS. 5A-5C. With reference to FIGS. 1-5C, the pitch of the airfoil 506 may be adjusted without causing the drone to climb or descend in order to maximize the light energy harvested. Unlike the adjustments of roll angles, the adjustment of pitch may be more limited since directly pitch directly affects the L/D, which is strongly linked to the angle of attack of the airfoil 506. The cambered airfoil illustrated in FIGS. 5A-5C (i.e., having a curved top surface and a flat bottom surface) generates lift at a zero angle of attack, which may generate sufficient lift to maintain level flight.

In FIG. 5A, the asymmetric airfoil 506 is flying straight and level, parallel to the vector F of the airflow. In this case, both the pitch and the angle of attack of the asymmetric airfoil 506 are at or close to zero. In addition, the elevon 508 on the trailing portion of the asymmetric airfoil 506 is not deflected. This straight and level attitude is the lowest drag configuration for the asymmetric airfoil 506 and may provide sufficient lift L1 to maintain level flight. Beamed power is delivered to the asymmetric airfoil 506 from the artificial light 66 coming from directly beneath the asymmetric airfoil 506. Thus, with the lower surface of the asymmetric airfoil 506 facing directly at the artificial light 66, the received power may be maximized.

In FIG. 5B, the beam power is delivered to the asymmetric airfoil 506 from the artificial light 66 coming from slightly ahead of the asymmetric airfoil 506. With the artificial light received from slightly forward (and below), if the asymmetric airfoil 506 maintains a close to zero angle of attack, the light power harvested from the artificial light 66 would be reduced. According to various embodiments, the elevon 508 may be deflected upwards, as shown in FIG. 5B. One effect of the upwardly deflected elevon 508 is to reduce lift on the asymmetric airfoil 506. Another effect of the upwardly deflected elevon 508 is that the leading edge of the asymmetric airfoil 506 will pitch upwardly due to the reduction in lift aft of the center of gravity. For a conventional fixed wing aircraft, the airfoil configuration shown in FIG. 5B would cause significant pitch upward, the wing would increase its angle of attack and associated lift, and the drone would begin to climb. However, in accordance with various embodiments, a quad-rotor drone (e.g., 101 in FIGS. 1 and 2) may provide pitch control by using the rotors to reduce the pitch-up and keep the asymmetric airfoil 506 at a lower angle of attack. The net angle of attack produced may be the result of decreased lift from the deflected elevon, but that decreased lift may be compensated for by the increase in lift due to the increased angle of attack of the asymmetric airfoil 506. Thus, the net angle of attack with the configuration shown in FIG. 5B may provide a net lift L2 that allows the drone to continue straight and level flight, while better exposing the bottom surface of the asymmetric airfoil 506 to the beamed power, thus maximizing light power harvesting.

In FIG. 5C, the beam power is delivered to the asymmetric airfoil 506 from the artificial light 66 coming from slightly behind the asymmetric airfoil 506. With the artificial light received from slightly behind (and below), if the asymmetric airfoil 506 maintains a close to zero angle of attack, the light power harvested from the artificial light 66 would be reduced. According to various embodiments, the elevon 508 may be deflected downwards, as shown in FIG. 5C. One effect of the downwardly deflected elevon 508 is to increase lift on the asymmetric airfoil 506. Another effect of the downwardly deflected elevon 508 is that the leading edge of the asymmetric airfoil 506 will pitch downward due to the increase in lift aft of the center of gravity. For a conventional fixed wing aircraft, the airfoil configuration shown in FIG. 5C would cause significant pitch downward, the wing would decrease its angle of attack and associated lift, and the drone would begin to dive. However, in accordance with various embodiments, a quad-rotor drone (e.g., 101 in FIGS. 1 and 2) may provide pitch control by using the rotors to reduce the pitch-down and keep the asymmetric airfoil 506 at a higher angle of attack. The net angle of attack produced may be the result of increased lift from the deflected elevon, but that increased lift may be compensated for by the decrease in lift due to the decreased angle of attack of the asymmetric airfoil 506. Thus, the net angle of attack with the configuration shown in FIG. 5C may provide a net lift L3 that allows the drone to continue straight and level flight, while better exposing the bottom surface of the asymmetric airfoil 506 to the beamed power, thus maximizing light power harvesting. However, flying the drone in such a configuration may increase drag, and thus increase the power consumed by the motors while maintaining this flight attitude.

Figure 6:
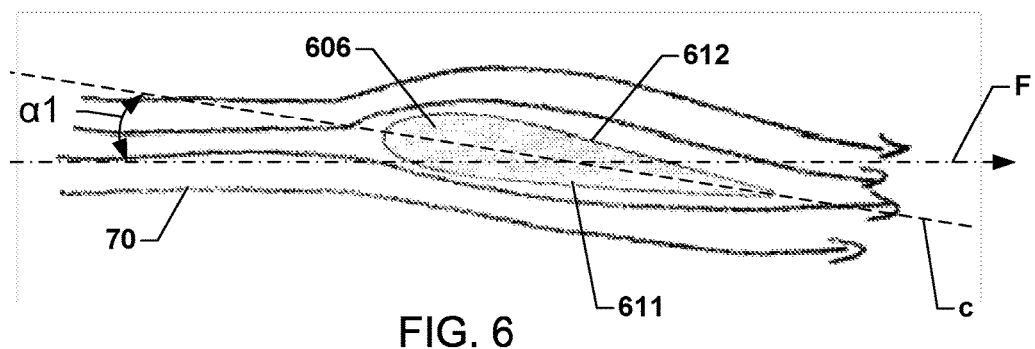
FIG. 6 is a side cross-sectional view of a symmetric airfoil configured at an angle of attack, according to various embodiments.

In accordance with various embodiments, the drone (e.g., drone 101) may include wings comprising symmetric airfoils, a cross-section of one such symmetric airfoil is illustrated in FIG. 6. With reference to FIGS. 1-6, each wing of the fixed-wing drone may include a symmetric airfoil 606, which includes symmetric curvatures of a lower surface 611 and an upper surface 612. An airflow 70 is illustrated moving past the symmetric airfoil from left to right. Symmetric airfoils are generally configured to provide no lift at an angle of attack of zero (i.e., flying directly into the horizontal H). In FIG. 6, the symmetric airfoil 606 is oriented with a slight angle of attack $\alpha 1$, sufficient to maintain level flight. The angle of attack $\alpha 1$ with relation to the wings (e.g., 106) of the drone (e.g., 101) may also be considered when determining an optimal drone attitude. The angle of attack $\alpha 1$ is the angle between a chord line C of the airfoil (e.g., symmetric airfoil 606) and a vector F representing the relative motion between the airfoil and the airflow 70. Only limited adjustments may generally be made to the angle of attack $\alpha 1$ since the L/D is strongly linked to the angle of attack $\alpha 1$. Typically, aircraft control systems try to optimize the angle of attack $\alpha 1$, over an increased in light energy harvesting efficiency.

Figure 7A:
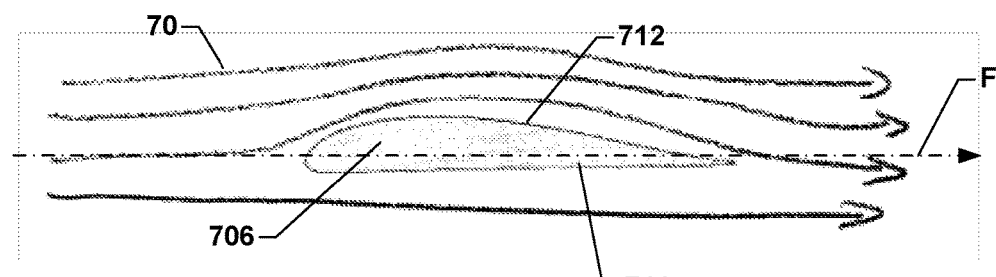
FIG. 7A is a side cross-sectional view of an asymmetric airfoil configured at or close to a zero angle of attack, according to various embodiments.
Figure 7B:
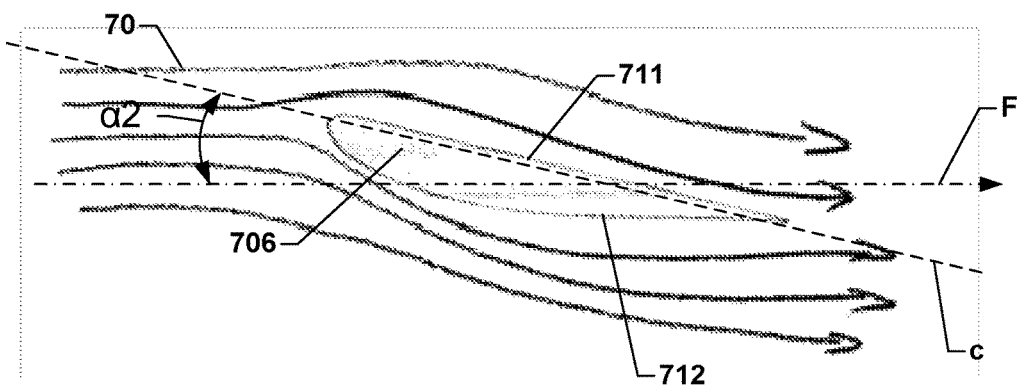
FIG. 7B is a side cross-sectional view of the asymmetric airfoil of FIG. 7A inverted and configured at an angle of attack, according to various embodiments.

In accordance with various embodiments, the drone (e.g., drone 101) may include wings comprising asymmetric airfoils, a cross-section of one such asymmetric airfoil is illustrated in FIGS. 7A and 7B. With reference to FIGS. 1-7B, each wing of the fixed-wing drone may include an asymmetric airfoil 706, which includes a first curvature of a lower surface 711 that is different from a second curvature of an upper surface 712. The asymmetric airfoil 706, which is also referred to as a cambered airfoil, may be used for a drone (e.g., 101) optimized to be flown with a different angle of attack in a first attitude as compared to the angle of attack used in a second attitude used for inverted flight.

In FIG. 7A, the asymmetric airfoil 706 is oriented in a first attitude, with an angle of attack at zero, so that a cord of the asymmetric airfoil 706 is parallel to the vector F of the airflow 70. The asymmetric airfoil 706 may be much more efficient at generating lift than a symmetric airfoil, and thus may generate lift with an attitude at or near a zero angle of attack. In FIG. 7B, the asymmetric airfoil 706 is inverted from the first attitude in FIG. 7A to a second attitude. In the orientation shown in FIG. 7B, the asymmetric airfoil 706 requires a significant angle of attack α2 in order to generate lift, which is associated with a lower L/D.

Various embodiments may include drones optimized for expected flight conditions through a selection of an airfoil configuration. The asymmetric airfoil 706 may be useful for drone applications in which drones spend more time in one configuration than another. For example, drones that are used exclusively for daytime flight may use an asymmetric airfoil (e.g., asymmetric airfoil 706) configured to be more efficient at generating lift one orientation and to include photovoltaic surfaces on the upper side in that orientation.

Alternatively, drones may be configured to harvest approximately the same amount of light energy from the ground (i.e., artificial light) as compared to from the Sun (i.e., sunlight) in watts per square meter. In this way, knowledge about the rate of power supplied from the artificial light and sunlight may inform the design choice of airfoil or a particular drone. For example, sunlight may provide about 1,000 watts/m$^2$, but the effective amount that is generally harvested may only be approximately 300-400 watts/m$^2$ (due to solar cells not harvesting evenly over all wavelengths). In addition, the effective amount of energy that may be harvested from sunlight may be lower if the drone is not operating in clear skies. Also, the amount of power transmitted from the terrestrial-based power beam emitters may depend on what type of beam emitter is available/used, aerial obstructions/interference, or other considerations. For example, some terrestrial-based power beam emitters transmit relatively high-power artificial light of 300-400 watts/m$^2$. For drones expected to harvest light energy from such high-power artificial light, symmetric airfoils may be used since the effective amount of sunlight harvested is roughly the same effective amount of artificial light harvest. In contrast, some terrestrial-based power beam emitters may transmit relatively low-power artificial light of 50-100 watts/m$^2$. Thus, for drones expected to harvest light energy from such low-power artificial light, asymmetric airfoils may be preferred. An asymmetrical airfoil may be configured to provide a maximum L/D when flying in the orientation receiving lower level of light energy, since the lower L/D when flying inverted may be compensated by the higher level of light energy received. Even though harvesting energy from sunlight may be generally less efficient, since the Sun may provide 3-4 times the amount of light energy as compared to relatively low-power artificial light provided by terrestrial-based power beam emitters, the drone may be able to harvest sufficient energy to maintain level flight.

Figure 8:
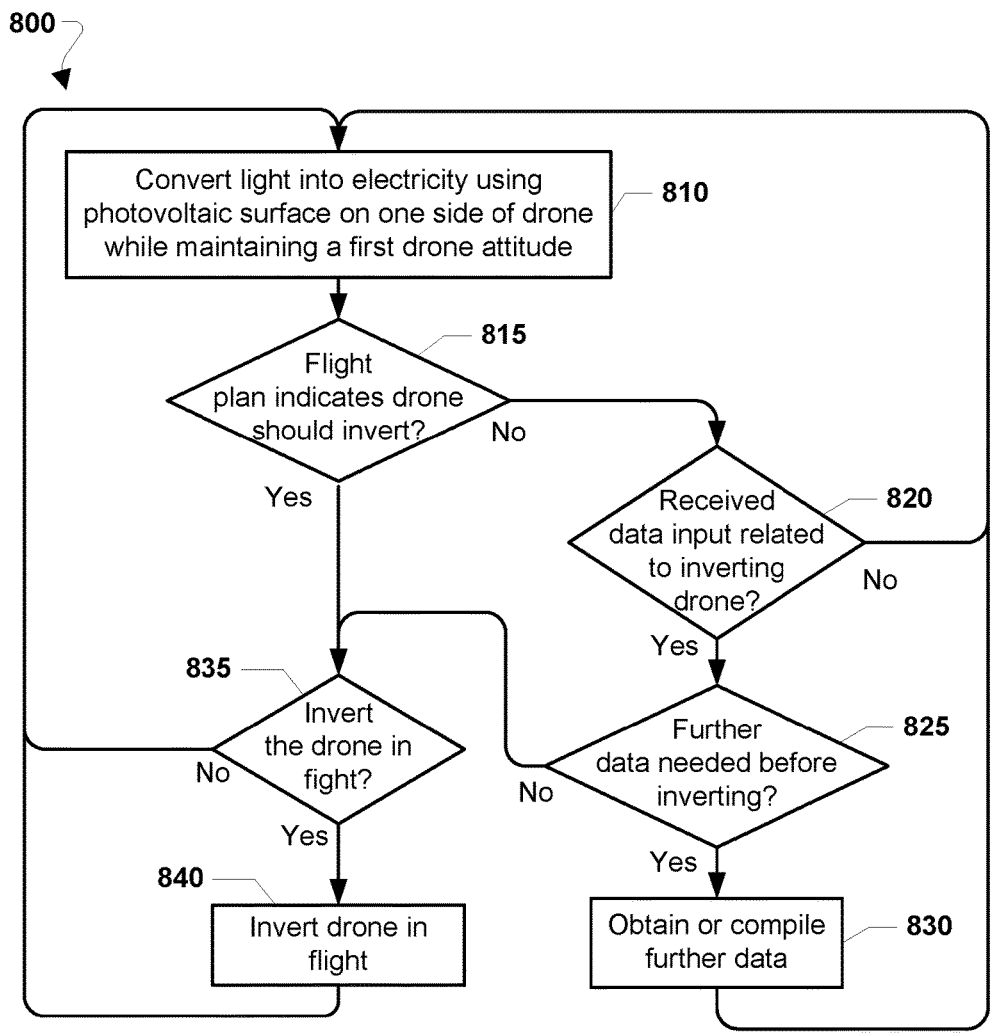
FIG. 8 is a process flow diagram illustrating a method of operating a drone according to various embodiments.

FIG. 8 illustrates a method 800 of operating a drone according to various embodiments. With reference to FIGS. 1-8, the method 800 may be implemented by a processor (e.g., 220) directing control of the drone (e.g., 101). In some embodiments, the method 800 may also be implemented by (in addition to or as an alternative of) a processor of a remote computing device (e.g., a remote computing device 30 or a remote server 40) that sends instructions to the processor of the drone. For example, a remote computing device may perform some of the operations of the method 800 and send instructions to a processor on the drone (e.g., a control processor or a modem processor). For ease of description, the term "processor" is used in the description of the method 800 to refer to a processor of the drone, a processor of a remote computing device, or a combination of both.

In block 810, the drone may convert light into electricity using a photovoltaic surface (e.g., 110) on one side of the drone, while maintaining a first drone attitude in flight. The light being converted into electricity may be sunlight or artificial light. The first drone attitude may direct the photovoltaic surface on the one side of the drone to face in a first direction.

In determination block 815, the processor may determine whether a current or predetermined flight plan indicates the drone is scheduled to invert. The flight plan may take into account the drone's current position, a time of day, availability of sunlight or artificial light, and/or other considerations for the drone to reach a designated destination. In some embodiments, the flight plan in block 810 may include instructions for the drone to invert at a particular time or location.

In response to determining that a current or predetermined flight plan indicates the drone is scheduled to invert (i.e., determination block 815="Yes"), the processor may determine whether the drone is ready to fly inverted in determination block 835. Otherwise, in response to determining that a current or predetermined flight plan indicates the drone is not scheduled to invert (i.e., determination block 815="No"), the processor may determine whether a data input related to inverting the drone is received in determination block 820.

The processor may receive various types of data related to inverting the drone and from various sources. For example, the processor of the drone may receive data input from onboard the drone, such as from a light sensor, anemometer, stored power-level indicators, camera, other sensors/instruments, or a combination thereof. For example, a light sensor on the drone 101 may provide a measure of incident light on the photovoltaic surface (received by the processor as a data input). That measure of light may be compared to a light reception threshold in order to determine whether sufficient light is being received on the photovoltaic surface (e.g., 110). Alternatively, one or more light sensors on the drone 101 may provide a measure of incident light on both sides of the drone. Both measures of incident light, from both sides of the drone, may be compared for determining whether to invert the drone to the second drone attitude.

As another example, the processor may receive a message from a remote computing device (e.g., 30), a remote server (e.g., 40), and/or a communication network (e.g., 50) via at least one base station (e.g., 20). The message received may include environmental information related to the light energy harvesting or navigational information for the drone. For example, environmental information may be received, which may include wind speeds, temperature, air quality/composition, weather, and similar information related to conditions surrounding or near the drone that may affect light energy harvesting, effectiveness, or efficiency. Such a received message including position information may be pushed to the drone (i.e., not specifically requested) or received in response to a request for such information transmitted by the drone. In some embodiments, the message may include geographic coordinates, altitude, proximity information to obstacles, base stations, and other elements.

In embodiments in which the method 800 is implemented (at least partially) by a processor of a remote computing device (e.g., a remote computing device 30 or a remote server 40), the remote computing device may determine position information based on information received from the drone (e.g., in response to a request, on a periodic basis, etc.). The data related to inverting the drone may also include navigational instructions, a change, update, and/or addition to the flight plan, instruction requiring a reduction or increase in power expenditure or speed, or other commands (e.g., a detour, pick-up/drop-off payload, etc.).

In response to determining that data input related to inverting the drone is received (i.e., determination block 820="Yes"), the processor may determine whether further data related to inverting the drone is needed before actually inverting the drone in determination block 825. Otherwise, in response to determining that data input related to inverting the drone has not been received (i.e., determination block 820="No"), the processor may continue to convert light into electricity using the photovoltaic surface on the one side of the drone in block 810.

In response to determining that a data input related to inverting the drone is received (i.e., determination block 820="Yes"), the processor may determine whether additional data related to inverting the drone is needed in determination block 825.

In response to determining that additional data related to inverting the drone is needed (i.e., determination block 825="Yes"), the processor may obtain or compile further data in block 830. Thereafter or while obtaining/compiling further data, the processor may continue to convert light into electricity using the photovoltaic surface on the one side of the drone in block 810.

In response to determining that additional data related to inverting the drone is not needed (i.e., determination block 825="No"), the processor may determine whether the drone is ready to fly inverted in determination block 835. In response to determining that the drone is not ready to invert (i.e., determination block 835="No"), the processor may continue to convert light into electricity using the photovoltaic surface on the one side of the drone in block 810.

In response to determining that the drone is ready to invert (i.e., determination block 835="Yes"), the processor may control the drone to invert by maneuvering from a first drone attitude to a second drone attitude in block 840.

The processor may continue to convert light into electricity using the photovoltaic surface on the one side of the drone in block 810 and repeat the operations of determination blocks 815, 820, 825, and 835, as well as blocks 830 and 840 to operate the drone using selective power capture in accordance with various embodiments. Thus, the processor may iteratively monitor the flight plan or received input data in order to determine whether to invert. In repeating the operations of determination blocks 815, 820, 825, and 835, as well as blocks 830 and 840, the processor may invert the attitude currently maintained by the drone to another attitude.

Figure 9:
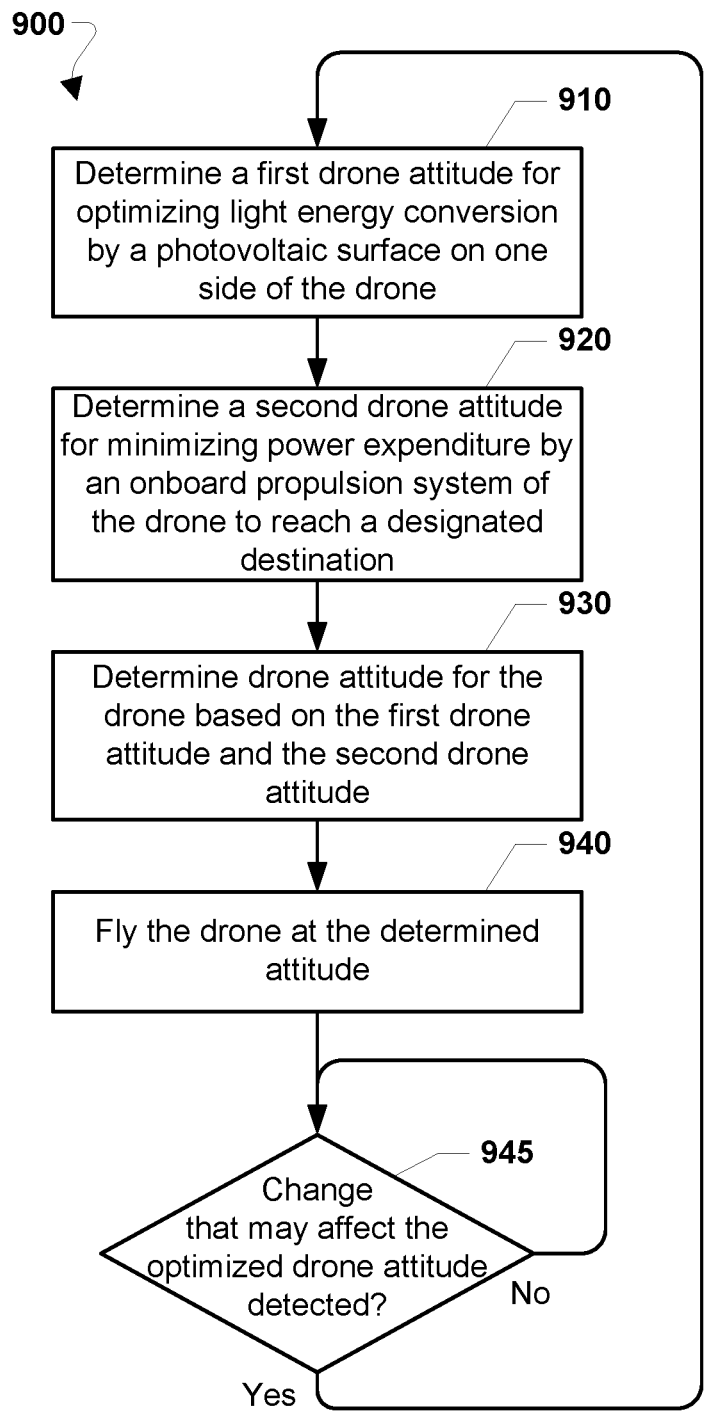
FIG. 9 is a process flow diagram illustrating a method of operating a drone according to various embodiments.

FIG. 9 illustrates a method 900 of operating a drone according to various embodiments. With reference to FIGS. 1-9, the method 900 may be implemented by a processor (e.g., the processor 220) of the drone (e.g., 101). In some embodiments, the method 900 may also be implemented by (in addition to or as an alternative of) a processor of a remote computing device (e.g., a remote computing device 30 or a remote server 40) that sends instructions to the processor of the drone. For example, a remote computing device may perform some of the operations of the method 900 and send instructions to a processor on the drone (e.g., a control processor or a modem processor). For ease of description, the term "processor" is used in the description of the method 900 to refer to either a processor of the drone, a processor of a remote computing device and a combination of both.

In block 910, the processor may determine a first drone attitude for optimizing light energy conversion by a photovoltaic surface on one side of the drone. The first drone attitude may face the photovoltaic surface directly at a primary light source of the light energy harvesting. Optimizing light energy conversion by the photovoltaic surface is generally achieved by orienting the photovoltaic surface perpendicular to the incident light, which is the light falling on or striking the photovoltaic surface. The first drone attitude may be determined based on the current date and time. For example, by knowing the current date and time, as well as the drone's current position, a relative position or direction of the Sun may be calculated.

In block 920, the processor may determine a second drone attitude for minimizing power expenditure by an onboard propulsion system of the drone to reach a designated destination.

In block 930, the processor may determine a compromise drone flight attitude for flying the drone based on the first drone attitude and the second drone attitude. The flight attitude may be a drone attitude that trades off or represents a compromise between energy conversion efficiency and energy consumption required to maintain the attitude and/or other mission considerations (e.g., progress towards a destination, maintaining station, etc.). The drone flight attitude determined in block 930 may be based on an average of the first drone attitude (i.e., from block 910) and the second drone attitude (i.e., from block 920). Alternatively, one of the first drone attitude and the second drone attitude may be weighted more heavily in determining the attitude at which to fly the drone. The determined flight attitude may include a roll angle at which light energy harvesting supplies enough power to sustain level flight while considering the amount of lift and drag generated by the wings at the roll angle. As a further alternative, the determined flight attitude may be further based on a third attitude that minimizes a total energy required to reach the designated destination, a time to reach the designated destination, and/or distance traveled to reach the designated destination. Other mission parameters may also be considered in determining the flight attitude in block 930.

In determining the first (e.g., optimized) drone attitude in block 910, the second drone attitude (e.g., efficient flight attitude) in block 920, and/or the flight attitude determined in block 930, the processor may access information from a database containing information that enables the processor to make such determinations. For example, the database may include information correlating drone position to whether to use a particular light source. Additionally or alternatively, the database may include information about at least one planned route of the drone, including location information of one or more terrestrial-based power beam emitters along that route. For example, using such a database and the current position of the drone, the drone may identify the closest terrestrial-based power beam emitter and thus which light source to use for harvesting light power along the route. The database may be stored in onboard memory (e.g., memory 222) or in a remote computing device (e.g., a remote computing device 30 or a remote server 40) in communication with the drone processor. For example, the database may include information about the location and altitude of the closest base stations.

In block 940, the processor may fly the drone at the determined attitude while converting light into electricity en route to the designated destination.

In determination block 945, the processor may determine whether changes have occurred that may affect the optimized drone attitude determined in block 910. For example, information obtained from the database may indicate the first drone attitude for optimizing light energy conversion determined in block 910 has changed. As another example information obtained from the database may indicate the second drone attitude for minimizing power expenditure has changed. Also, the way in which the optimized drone attitude is determined in block 910, based on the first and second drone attitudes may have changed.

In response to determining that no changes have occurred that may affect the optimized drone attitude determined in block 910 (i.e., determination block 945="No"), the processor may continue to determine whether changes have occurred that may affect the optimized drone attitude in determination block 945.

In response to determining that changes have occurred that may affect the optimized drone attitude (i.e., determination block 945="Yes"), the processor may once again determine the first drone attitude, the second drone attitude, and the optimized drone attitude in blocks 910, 920, and 930, respectively, before maneuvering the drone into the determined attitude in block 940.

The processor may repeat the operations of blocks 910-940 and determination block 945. Thus, the processor may iteratively monitor for needed changes in the attitude of the drone. In repeating the operations of blocks 910, 920, 930, and 940 and determination block 945, the drone may operate at a drone attitude that tradeoffs energy conversion efficiency and energy consumption required to maintain the attitude and/or other mission considerations (e.g., progress towards a destination, maintaining station, etc.).

Figure 10:
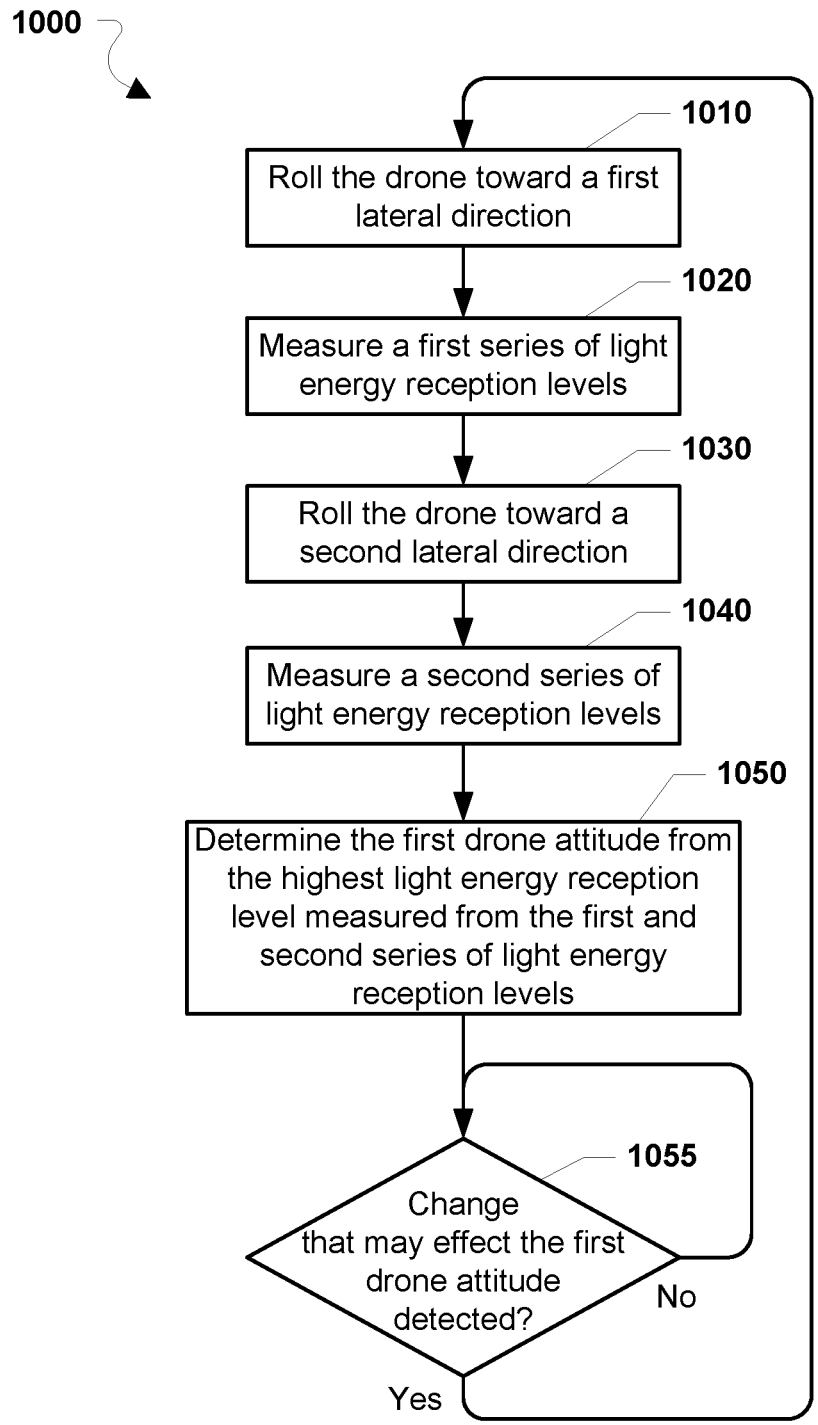
FIG. 10 is a process flow diagram illustrating a method of operating a drone according to various embodiments.

FIG. 10 illustrates a method 1000 of operating a drone according to various embodiments. The method 1000 may be used to determine a first drone attitude, which provides optimum light energy harvesting, based on real-time measurements. With reference to FIGS. 1-10, the method 1000 may be implemented by a processor (e.g., the processor 220) of the drone (e.g., 101). In some embodiments, the method 1000 may also be implemented by (in addition to or as an alternative of) a processor of a remote computing device (e.g., a remote computing device 30 or a remote server 40) that sends instructions to the processor of the drone. For example, a remote computing device may perform some of the operations of the method 1000 and send instructions to a processor on the drone (e.g., a control processor or a modem processor). For ease of description, the term "processor" is used in the description of the method 1000 to refer to either a processor of the drone, a processor of a remote computing device and a combination of both.

In block 1010, the processor may direct the drone to roll toward a first lateral direction. Rolling the drone may include pivoting the drone along a longitudinal axis through a first series of roll angles. The processor may direct the drone to roll through the first series of roll angles for taking a series of measurements. Rolling the drone through the first series of roll angles may be performed by the drone for a first period of time.

In block 1020, the processor may measure a first series of light energy reception levels during the first period across the first series of roll angles. Measuring the first series of light energy reception levels may each comprise measuring a plurality of light energy reception levels at regular intervals. The first period may end at the shorter of a predetermined period or a time corresponding to consecutive decreases in the measured light energy reception levels following an increase in the measured light energy reception levels.

In block 1030, the processor directing the control of the drone to maneuver may direct the drone to roll toward a second lateral direction, opposite the first lateral direction. Rolling the drone may include pivoting the drone along the longitudinal axis through second series of roll angles, in the opposite direction to the first series of roll angles. The processor may direct the drone to roll through the second series of roll angles for taking a series of measurements. Rolling the drone through the second series of roll angles may be performed by the drone for a second period.

In block 1040, the processor may measure a second series of light energy reception levels during the second period across the second series of roll angles. Measuring the second series of light energy reception levels may each comprise measuring a plurality of light energy reception levels at regular intervals. The second period may end at the shorter of a predetermined period or a time corresponding to consecutive decreases in the measured light energy reception levels following an increase in the measured light energy reception levels.

In block 1050, the processor may determine the first drone attitude from the highest light energy reception level measured from the first and second series of light energy reception levels.

In determination block 1055, the processor may determine whether changes have occurred that may affect the tradeoffs of energy conversion efficiency against energy consumption required to maintain the attitude and/or other mission considerations (e.g., progress towards a destination, maintaining station, etc.). For example, information obtained from the database may indicate the first drone attitude for improving light energy conversion has changed.

In response to determining that no changes have occurred that may suggest the need to change the drone attitude (i.e., determination block 1055="No"), the processor may continue to determine whether changes have occurred that may suggest the need to change the drone attitude in determination block 1055. Otherwise, in response to determining that changes have occurred that may suggest the need to change the drone attitude (i.e., determination block 1055="Yes"), the processor may once again determine the first drone attitude, the second drone attitude, and determine a compromise drone attitude in blocks 1010-1050.

The processor may repeat the operations of blocks 1010-1050 and determination block 1055. Thus, the processor may iteratively monitor for needed changes in the attitude of the drone. In repeating the operations of blocks 1010-1050 and determination block 1055, the drone may fly in an attitude that tradeoffs of energy conversion efficiency against energy consumption required to maintain the attitude and/or other mission considerations (e.g., progress towards a destination, maintaining station, etc.).

Figure 11:
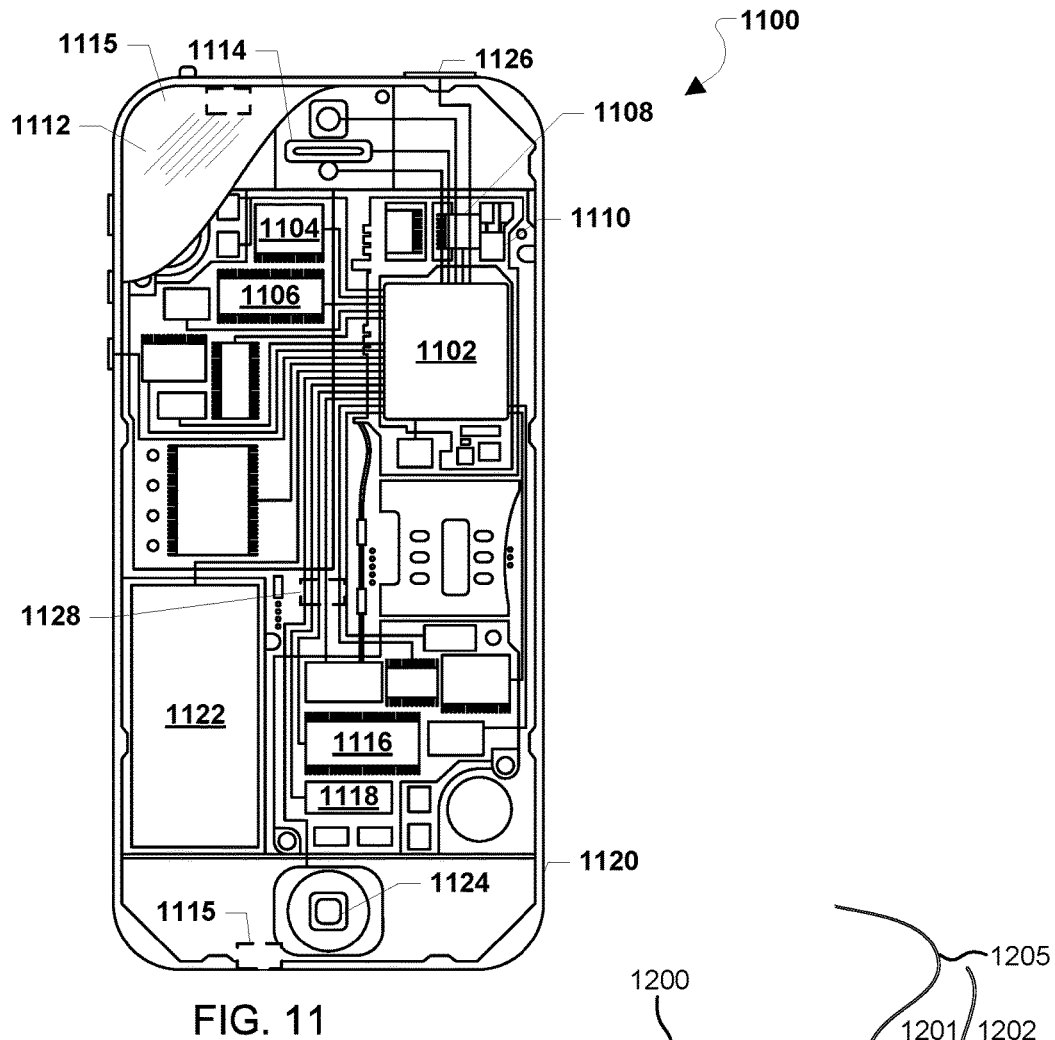
FIG. 11 is a component diagram of a wireless communication device suitable for use with various embodiments.
Figure 12:
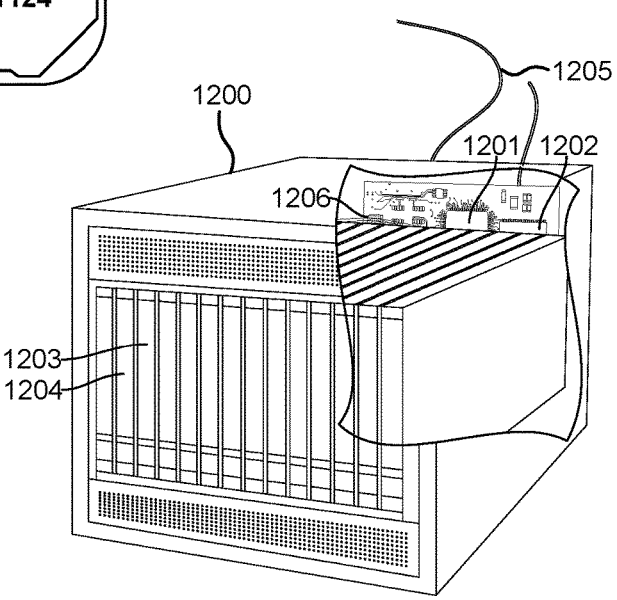
FIG. 12 is a component diagram of an example server suitable for use with the various embodiments.

As described, the processor determining which light source the drone (e.g., 101) should use to harvest light energy may be in a separate computing device that is in communication with the drone. In such embodiments, communications with the drone may be implemented using any of a variety of wireless communication devices (e.g., smartphones, tablets, smartwatches, etc.) an example of which is illustrated in FIG. 11. With reference to FIGS. 1-11, a wireless communication device 1100 may include a processor 1102 coupled with the various systems of the wireless communication device 1100 for communication with and control thereof. For example, the processor 1102 may be coupled to a touch screen controller 1104, radio communication elements, speakers and microphones, and an internal memory 1106. The processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof. In another embodiment (not shown), the wireless communication device 1100 may also be coupled to an external memory, such as an external hard drive.

The touch screen controller 1104 and the processor 1102 may also be coupled to a touch screen panel 1112, such as a resistive-sensing touch screen, capacitive-sensing touch screen, infrared sensing touch screen, etc. Additionally, the display of the wireless communication device 1100 need not have touch screen capability. The wireless communication device 1100 may have one or more radio signal transceivers 1108 (e.g., Peanut, Bluetooth, Bluetooth LE, ZigBee, Wi-Fi®, radio frequency (RF) radio, etc.) and antennae, the wireless communication device antenna 1110, for sending and receiving communications, coupled to each other and/or to the processor 1102. The radio signal transceivers 1108 and the wireless communication device antenna 1110 may be used with the above-mentioned circuitry to implement the various wireless transmission protocol stacks and interfaces. The wireless communication device 1100 may include a cellular network wireless modem chip 1116 coupled to the processor that enables communication via a cellular network.

The wireless communication device 1100 may include a peripheral device connection interface 1118 coupled to the processor 1102. The peripheral device connection interface 1118 may be singularly configured to accept one type of connection, or may be configured to accept various types of physical and communication connections, common or proprietary, such as USB, FireWire, Thunderbolt, or PCIe. The peripheral device connection interface 1118 may also be coupled to a similarly configured peripheral device connection port (not shown).

In various embodiments, the wireless communication device 1100 may include one or more microphones 1115. For example, the wireless communication device may have microphones 1115 that are conventional for receiving voice or other audio frequency energy from a user during a call. The wireless communication device 1100 may also include speakers 1114 for providing audio outputs. The wireless communication device 1100 may also include a housing 1120, constructed of a plastic, metal, or a combination of materials, for containing all or some of the components. The wireless communication device 1100 may include a power source 1122 coupled to the processor 1102, such as a disposable or rechargeable battery. The rechargeable battery may also be coupled to the peripheral device connection port to receive a charging current from a source external to the wireless communication device 1100. The wireless communication device 1100 may also include a physical button 1124 for receiving user inputs. The wireless communication device 1100 may also include a power button 1126 for turning the wireless communication device 1100 on and off.

In various embodiments, the wireless communication device 1100 may further include an accelerometer 1128, which senses movement, vibration, and other aspects of the device through the ability to detect multi-directional values of and changes in acceleration. In the various embodiments, the accelerometer 1128 may be used to determine the x, y, and z positions of the wireless communication device 1100. Using the information from the accelerometer, a pointing direction of the wireless communication device 1100 may be detected.

Various forms of computing devices may be used to communicate with a processor of a drone, including personal computers, wireless communication devices (e.g., smartphones, etc.), servers, laptop computers, etc., to implement the various embodiments including the embodiments described with reference to FIGS. 1-11. Such computing devices may typically include, at least, the components illustrated in FIG. 12, which illustrates an example server computing device. With reference to FIGS. 1-12, the server 1200 may typically include a processor 1201 coupled to volatile memory 1202 and a large capacity nonvolatile memory, such as a disk drive 1203. The server 1200 may also include a floppy disc drive, compact disc (CD) or DVD disc drive 1206 coupled to the processor 1201. The server 1200 may also include network access ports 1204 (or interfaces) coupled to the processor 1201 for establishing data connections with a network 1205, such as the Internet and/or a local area network coupled to other system computers and servers. Similarly, the server 1200 may include additional access ports, such as USB, Firewire, Thunderbolt, and the like for coupling to peripherals, external memory, or other devices.

In various embodiments, the drone (e.g., 101) may be configured to access the server 1200 to periodically acquire position information for identifying a location of the drone or access a database correlating drone position to whether to use a particular one of the first and second antennas for active communications and/or communication links with the server 1200. For example, the drone may receive periodic communications, from the server 1200, indicating position information, instructions to compare antenna signal quality, and/or database updates. Alternatively or in addition, the drone may send periodic communications to the server 1200 providing current location coordinates of the drone and/or indicating which antenna the drone is using to handle active communications.

The various embodiments enable the processor of the drone to manage communications of the drone. By managing the communications of the drone as described, the various embodiments improve the operation of the drone and communications therewith. The various embodiments may increase antenna gain, which may reduce the current needed for transmitting and/or receiving communication signals and thus conserve power. In addition, by switching from using one antenna to using another antenna, the various embodiments may improve received and/or transmitted signal quality for the drone.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 800, 900 and/or 1000 may be substituted for or combined with another.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with various embodiments may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A non-transitory processor-readable storage medium having stored thereon processor-executable instructions configured to cause a processor of a drone having photovoltaic cells on at least one side of the drone (the "photovoltaic surface") to perform operations, comprising:
   determining, by the processor of the drone, a flight attitude for the drone based on one or more of a first drone attitude and a second drone attitude,
      wherein in the first drone attitude, more light energy is harvested by the drone as compared to when in the drone is in the second drone attitude, and
      wherein in the second drone attitude, power expenditure by an onboard propulsion system of the drone is reduced as compared to when the drone is in the first drone attitude; and
   flying the drone, by the processor controlling the drone, in the determined flight attitude while converting light into electricity en route to a designated destination.

2. The non-transitory processor-readable storage medium of claim 1, wherein in the first drone attitude the drone is controlled by the processor to face the photovoltaic surface directly at a primary light source of the light energy harvesting.

3. The non-transitory processor-readable storage medium of claim 1, wherein the first drone attitude is determined based on a current date and time.

4. The non-transitory processor-readable storage medium of claim 1, wherein the flight attitude includes a roll angle at which light energy harvesting supplies enough power to sustain level flight while considering an amount of lift and drag generated by wings of the drone in the roll angle.

5. The non-transitory processor-readable storage medium of claim 1, wherein determining the flight attitude comprises:
   rolling the drone toward a first lateral direction for a first period;
   measuring a first series of light energy reception levels during the first period;
   rolling the drone toward a second lateral direction, opposite the first lateral direction, for a second period;
   measuring a second series of light energy reception levels during the second period; and
   determining the first drone attitude from a highest light energy reception level measured from the first and second series of light energy reception levels.

6. The non-transitory processor-readable storage medium of claim 5, wherein measuring the first and second series of light energy reception levels each comprise measuring a plurality of light energy reception levels at regular intervals.

7. The non-transitory processor-readable storage medium of claim 5, wherein the first and second periods end at the shorter of a predetermined period or a time corresponding to consecutive decreases in the measured light energy reception levels following an increase in the measured light energy reception levels.

8. The non-transitory processor-readable storage medium of claim 1, wherein the flight attitude is further determined based on a third drone attitude that minimizes a time to reach the designated destination.

9. The non-transitory processor-readable storage medium of claim 1, wherein the flight attitude is further determined based on a third drone attitude that minimizes a distance traveled to reach the designated destination.

10. The non-transitory processor-readable storage medium of claim 1, wherein the flight attitude is further determined based on a third drone attitude that minimizes a total energy required to reach the designated destination.

\* \* \* \* \*